(12) United States Patent
Selm et al.

(10) Patent No.: US 6,167,620 B1
(45) Date of Patent: Jan. 2, 2001

(54) METHOD FOR TRANSPORTING HEAT EXCHANGER FINS AND FORMING A HEAT EXCHANGER CORE SUBASSEMBLY

(75) Inventors: Gerald Joseph Selm; Kevin Bennett Wise, both of Connersville, IN (US); Carl Eckardt Schornhorst, Canton, MI (US)

(73) Assignee: Ford Motor Company, Dearborn, MI (US)

( * ) Notice: Under 35 U.S.C. 154(b), the term of this patent shall be extended for 0 days.

(21) Appl. No.: 09/309,664

(22) Filed: May 11, 1999

(51) Int. Cl.$^7$ .................................................. B21D 53/06
(52) U.S. Cl. .............................. 29/890.046; 29/890.047; 29/726
(58) Field of Search ..................... 29/727, 726, 890.039, 29/890.047, 890.046

(56) References Cited

U.S. PATENT DOCUMENTS

| | | | |
|---|---|---|---|
| 3,463,343 | 8/1969 | Asenbauer | 220/8 |
| 4,286,486 | * 9/1981 | Franks . | |
| 4,378,873 | * 4/1983 | Cloudy . | |
| 4,494,288 | * 1/1985 | Nagai et al. . | |
| 4,558,784 | 12/1985 | Wallis | 206/561 |
| 4,929,144 | 5/1990 | Fraser | 414/799 |
| 5,192,019 | 3/1993 | Meehan | 229/101 |
| 5,244,082 | 9/1993 | Togashi | 198/803.01 |
| 5,303,810 | 4/1994 | Tani | 198/345.3 |
| 5,348,142 | 9/1994 | Nishimura et al. | 198/803.01 |
| 5,423,121 | * 6/1995 | McElroy, II et al. . | |
| 5,507,338 | 4/1996 | Schornhorst et al. | 165/76 |
| 5,732,460 | 3/1998 | Pasternoster et al. | 29/727 |

* cited by examiner

Primary Examiner—P. W. Echols
Assistant Examiner—Anthony L. Green
(74) Attorney, Agent, or Firm—Roger L. May; Hammond Coppiellie

(57) ABSTRACT

A method for transporting heat exchanger fins and forming a core subassembly for a heat exchanger uses a universal fin tray for all subassemblies instead of different tray sizes for different core subassemblies. The method includes indexing core plates forward under a stationary fin stuffing box, loading fins into the universal fin tray, indexing the loaded fins forward one at a time corresponding to the number of fins required, pushing required fins into the fin stuffing box when indexing reaches number required for the core subassembly, and pushing fins out of the fin stuffing box into the plates forming the core subassembly. A universal fin tray size, a stationary fin box, and a stationary cut off are used for all core sizes.

16 Claims, 2 Drawing Sheets

METHOD FOR TRANSPORTING HEAT EXCHANGER FINS AND FORMING A HEAT EXCHANGER CORE SUBASSEMBLY

TECHNICAL FIELD OF THE INVENTION

The present invention relates generally to heat exchangers, and, more particularly, to a method for manufacturing heat exchanger core subassemblies with varying fin and plate counts.

BACKGROUND OF THE INVENTION

Each vehicle has requirements for heat exchangers of a given size and fin count. In manufacturing a heat exchanger subassembly, an automated assembly machine is used. Associated with the machine are a fin tray line and a core line. Each heat exchanger subassembly model has its own fin trays so that models requiring 20 fins, for example, have a fin tray that holds 20 fins, while models requiring only 16 fins have a fin tray that holds only 16 fins. To change from a 20-fin model to a 16 fin model, the 20-fin tray must be removed and replaced with a 16-fin tray because a fin tray designed for one model will not accommodate fins for another model. Also, a cut off device must be shifted and adjusted to properly accommodate the 16-fin subassembly. While one assembly line can produce heat exchanger subassemblies of different requirements, doing so requires stopping the line while changes are made. The removing and replacing of trays and shifting of the cut off device increases manufacturing time thereby increasing manufacturing cost. Accordingly, it will be appreciated that it would be highly desirable to manufacture heat exchangers of different requirements in a continuous manufacturing operation without the removing, replacing and shifting of components and equipment now required.

SUMMARY OF THE INVENTION

The present invention is directed to overcoming one or more of the problems set forth above. Briefly summarized, according to one aspect of the present invention, a method for transporting heat exchanger fins and forming a core subassembly for a heat exchanger uses fin trays capable of holding fins for heat exchanger core subasemblies requiring different numbers of fins. The method includes indexing core forward under a stationary fin stuffing box, loading fins into the fin tray, indexing the loaded fins forward one at a time corresponding to the number of fins required, pushing required fins into the fin stuffing box when indexing reaches number required for the core subassembly, and pushing fins out of the fin stuffing box into the plates forming the core subassembly. A common fin tray size, a stationary fin box, and a stationary cut off are used for all core sizes.

While one assembly line can produce heat exchanger subassemblies of different requirements, doing so requires stopping the line while changes are made. The removing and replacing of trays and shifting of the cut off device increases the time required for manufacturing which increases manufacturing cost. Using a common fin tray and stationary cut off facilitate manufacturing heat exchangers of different requirements in an efficient, continuous manufacturing operation. Eliminating the removing, replacing and shifting of heretofore required also reduces risk of manufacturing thereby reducing waste and improving quality.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
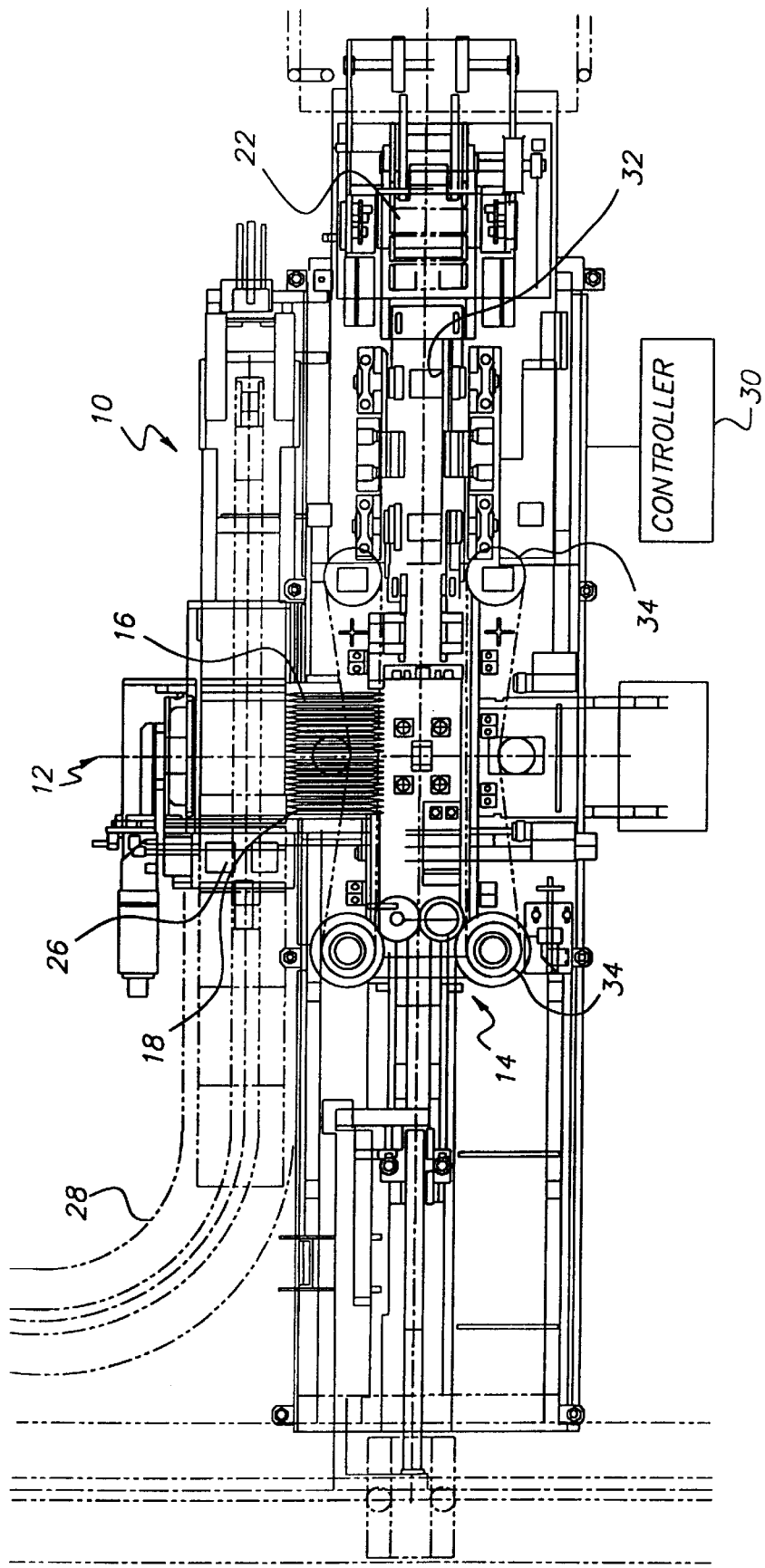
FIG. 1 is a diagram of a machine for making a core element for a folded plate heat exchanger.
Figure 2:
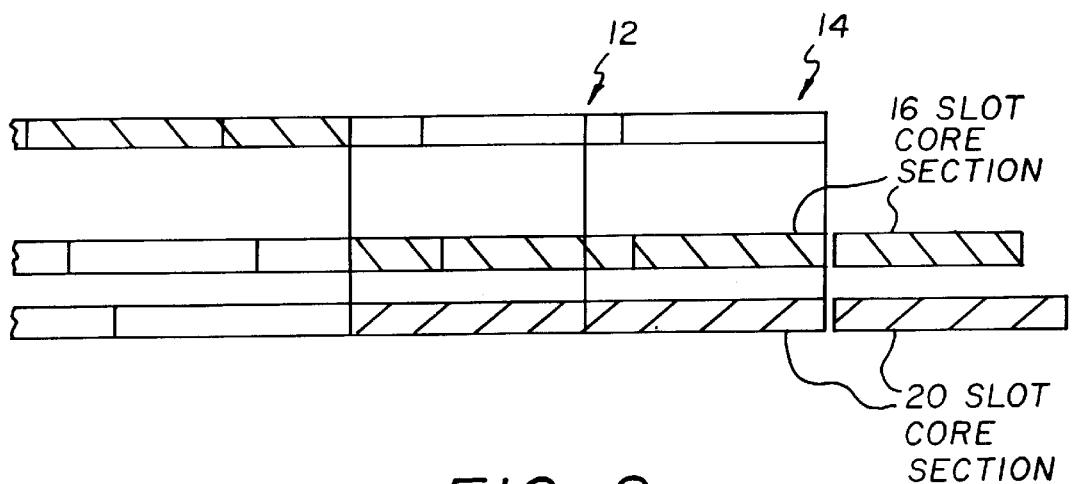
FIG. 2 is a flow diagram illustrating the movement of core plates and fins in manufacturing a heat exchanger subassembly according to the present invention.
Figure 3:
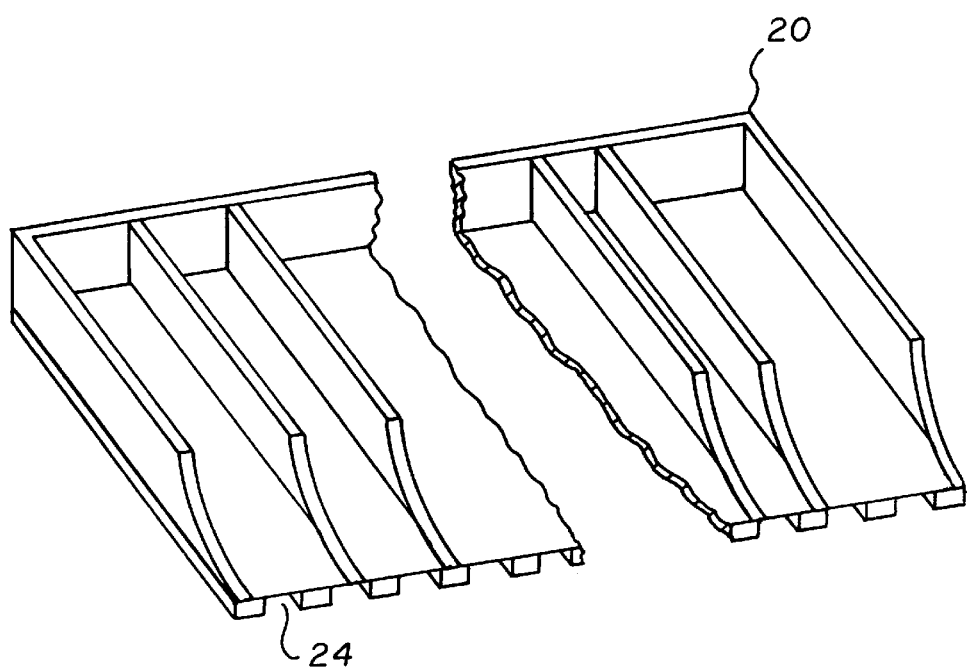
FIG. 3 is a perspective view of a tray for transporting heat exchanger fins.

Referring to FIGS. 1–3, a machine 10 for assembling a core element for a folded plate heat exchanger has fin stuffing station 12 and a core cutoff station 14. At the fin stuffing station 12, there is a stationary fin stuffing box 16 to receive fins 18 from a fin tray 20 prior to assembling the fins 18 with core plates 22. After the fins 18 and core plates 22 are assembled into a unit, the unit is cut at the cutting station 14. Such a machine is more fully described in U.S. Pat. No. 5,732,460, which issued Mar. 31, 1998 to Paternoster et al., the disclosure of which is incorporated herein by reference.

The fin tray 20 has a flat bottom with a series of notches 24 to engage teeth of a gear 26. Tray 20 moves along a conveyor 28 from a loading area to the fin stuffing station 12 of the machine 10 where it is positioned. Gear 26 can precisely position or index tray 20 one notch at a time under control of a controller 30. Tray 20 has a fixed number of slots, 17 fins for example, for receiving fins 18. A comb-like tool pushes fins 18 out of tray 20 into fin stuffing box 16. Controller 30 can be programmed with the number of fins required for a heat exchanger assembly and operated to use as many trays of fins as needed to load the box with the required fins.

Core plates 22 also move along a conveyor 32 to a position under the fin stuffing box by chain conveyor 34. When the plates are aligned and motionless under the fins, the fins are pushed into slots between adjacent plates filling the slots. The filled plates then move to the cutoff station 14 where the filled plates are cut off when the plates are again motionless forming a heat exchanger core assembly. By this process, a single core assembly can be formed, or core assemblies can be formed continuously.

The present invention is a method for transporting heat exchanger fins and forming a core subassembly for a heat exchanger. According to the method, core plates are indexed through the assembly machine and a desired number of core plates are accumulated for the core subassembly. The desired number of core plates are indexed forward under the stationary fin stuffing box. Fins are loaded into universal fin trays and the number of fins required for the core subassembly is determined. Fins loaded in the trays are indexed forward one at a time corresponding to the number of fins required using as many trays as necessary. The fin tray is advanced a distance predetermined for the number of fins requested. One sidewall of each tray is open to facilitate pushing out the fins. Pushing the required fins into the fin stuffing box when indexing reaches number required for the core subassembly is accomplished with the aid of a comb-like tool. The comb-like tool pushes fins out of the fin stuffing box into the plates forming the core subassembly.

Each core subassembly has a length defined by the number of plates or by the number of fins. The step of cutting the core subassembly to length is accomplished at the cutting station which remains stationary as the core subassembly moves along the assembly line. Cutting separates the desired plates stuffed with fins from the progression of connected plates. A plurality of core plates are stamped from sheet metal, connected to one another and folded accordion style back and forth on one another. Under control of the controller, changing the indexing of the fins changes length of the core subassembly, and changing the indexing of plates also changes the length of the core subassembly.

It will be now appreciated that there has been presented a method for transporting heat exchanger fins for forming a core subassembly for a heat exchanger. The method employs fin trays that are of a common size for all core lengths. The fin trays will hold 20, or any number of fins, and have slots on their bottom sides which engage a gear-toothed roller. When a core subassembly requiring 16 fins is being made, a computer controlled electric motor rolls the fin tray a distance predetermined for 16 fins. A comb-like tool pushes 16 fins off the tray into appropriate positions. If 18 fins are needed, the computer is programmed to roll the tray so that 18 fins are available and the comb-like tool pushes 18 fins into position. When 18 fins are used, 2 fins may remain in the 20-fin tray for use in the next core subassembly. These two fins are used and the computer knows how many fins on a second tray are needed. By computer controlling the operation, there is no need to remove and replace fin trays. Furthermore, the core also engages a second set of rollers which are computer controlled to roll the predetermined distance. This eliminates the need to move the core cut off device. The fin trays are also so aligned that they appear to be one continuous tray instead of separate trays.

While the invention has been described with reference to a heat exchanger subassembly, such as an evaporator subassembly, it is apparent that the invention is easily adapted to other devices that have fins and plates assembled together into a unit. While the invention has been described with particular reference to a preferred embodiment, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. For example, where core assemblies are formed continuously, a counter may be used in conjunction with the controller to count and cut the cores to length at the cutting station according to what size core is desired thereby increasing flexibility. It is accordingly intended that the claims shall cover all such modifications and applications as do not depart from the true spirit and scope of the invention.

What is claimed is:

1. A method for transporting heat exchanger fins and forming a core subassembly for a heat exchanger, comprising the steps of:
   indexing core plates through an assembly machine and accumulating a desired number of core plates for the core subassembly;
   indexing the desired number of core plates forward under a stationary fin stuffing box;
   loading fins into universal fin trays;
   determining number of fins required for the core subassembly;
   indexing fins loaded in the trays forward one at a time corresponding to the number of fins required;
   pushing required fins from the trays into the fin stuffing box when indexing reaches number required for the core subassembly; and
   pushing fins out of the fin stuffing box into the plates forming the core subassembly.

2. The method of claim 1, including the steps of:
   rolling the core subassembly toward a stationary cutter a distance predetermined by the number of fins in the subassembly; and
   cutting the core subassembly to length.

3. The method of claim 1, including the step of changing the indexing of the fins and changing the length of the core subassembly.

4. The method of claim 1, including the step of changing the indexing of plates and changing the length of the core subassembly.

5. The method of claim 1, including the step of advancing the fin tray a distance predetermined for the number of fins requested.

6. The method of claim 1, prior to the step of indexing core plates through an assembly machine and accumulating a desired number of core plates for the core subassembly, the steps of:
   stamping a plurality of core plates that are connected to one another; and
   folding the stamped core plates accordion style back and forth on one another.

7. The method of claim 1, including the step of advancing the tray to make a set number fins available when the set number fins are requested.

8. The method of claim 1, including the step of using of fins from multiple trays in one subassembly.

9. A method for transporting heat exchanger fins and forming a core subassembly for a heat exchanger, comprising the steps of:
   forming a plurality of core plates that are connected to one another;
   folding the core plates accordion style back and forth on one another;
   indexing the core plates through an assembly machine and accumulating a desired number of core plates for the core subassembly;
   indexing the desired number of core plates forward under a stationary fin stuffing box;
   loading fins into universal fin trays;
   indexing fins loaded in the trays forward one at a time corresponding to a number of fins required;
   pushing required fins from the trays into the fin stuffing box when indexing reaches number required for the core subassembly; and
   pushing fins out of the fin stuffing box into the plates forming the core subassembly.

10. The method of claim 9, including the steps of:
    rolling the core subassembly toward a stationary cutter a distance predetermined by the number of fins in the subassembly; and
    cutting the core subassembly to length.

11. The method of claim 9, including the step of changing the indexing of the fins and changing the length of the core subassembly.

12. The method of claim 10, including the step of changing the indexing of plates and changing the length of the core subassembly.

13. The method of claim 9, including the step of advancing the fin tray a distance predetermined for the number of fins requested.

14. The method of claim 9, including the step of advancing the tray to make a set number fins available when the set number of fins are requested.

15. The method of claim 9, including the step of using fins from multiple separate trays in one subassembly.

16. A method for transporting heat exchanger fins and forming a core subassembly for a heat exchanger, comprising the steps of:

indexing core plates through an assembly machine and accumulating a desired number of core plates for the core subassembly;

indexing the desired number of core plates forward under a stationary fin stuffing box;

loading fins into a universal fin tray;

determining number of fins required for the core subassembly;

indexing fins loaded in the tray forward one at a time corresponding to the number of fins required;

pushing required fins into the fin stuffing box when indexing reaches number required for the core subassembly;

pushing fins out of the fin stuffing box into the plates forming the core subassembly;

cutting the core subassembly to length with a stationary core cutter; and changing the indexing of the fins and changing length of the core subassembly without moving the stationary core cutter.

\* \* \* \* \*